(12) United States Patent
Heumann

(10) Patent No.: US 6,706,173 B1
(45) Date of Patent: Mar. 16, 2004

(54) FILTRATION SYSTEM

(75) Inventor: Thomas Heumann, McHenry, IL (US)

(73) Assignee: Thomas W Huemann, Johnsburg, IL (US)

( * ) Notice: Subject to any disclaimer, the term of this patent is extended or adjusted under 35 U.S.C. 154(b) by 110 days.

(21) Appl. No.: 10/137,716

(22) Filed: May 2, 2002

Related U.S. Application Data

(60) Provisional application No. 60/288,191, filed on May 2, 2001, now abandoned.

(51) Int. Cl.[7] .............................. B01D 36/00; B08B 3/14
(52) U.S. Cl. ..................... 210/167; 210/195.3; 210/196; 210/197; 210/255; 210/257.1; 210/258; 210/262; 210/416.1; 210/497.1; 210/497.01; 134/111
(58) Field of Search .......................... 134/10, 109–111; 210/121, 167, 195.1, 195.2, 195.3, 196, 197, 255, 257.1, 257.2, 258, 262, 321.78, 416.1, 497.1, 497.01

(56) References Cited

U.S. PATENT DOCUMENTS

| | | | |
|---|---|---|---|
| 5,409,613 A | | 4/1995 | Weaver |
| 5,582,743 A | * | 12/1996 | Larson et al. ............... 210/804 |
| 5,622,627 A | | 4/1997 | Fanning et al. |
| 6,568,409 B1 | * | 5/2003 | Fleck ........................ 134/110 |

* cited by examiner

Primary Examiner—Matthew O. Savage

(57) ABSTRACT

A filtration system for cleaning the fluid in a wash tank. The filtration system includes a process tank from which fluid is pumped to a filter element located in the wash tank. The filter element is formed of hollow porous tubes. The fluid is pumped from the process tank through the hollow porous tubes and back to the process tank. The fluid in the hollow porous tubes is at a greater pressure than that of the fluid in the wash tank in which it is submerged, such that fluid, but not particulate matter, with flow through the pores in the tubes to the wash tank. Cleaned fluid is thereby provided to the wash tank and fluid with a higher concentration of contaminants is returned to the process tank.

8 Claims, 6 Drawing Sheets

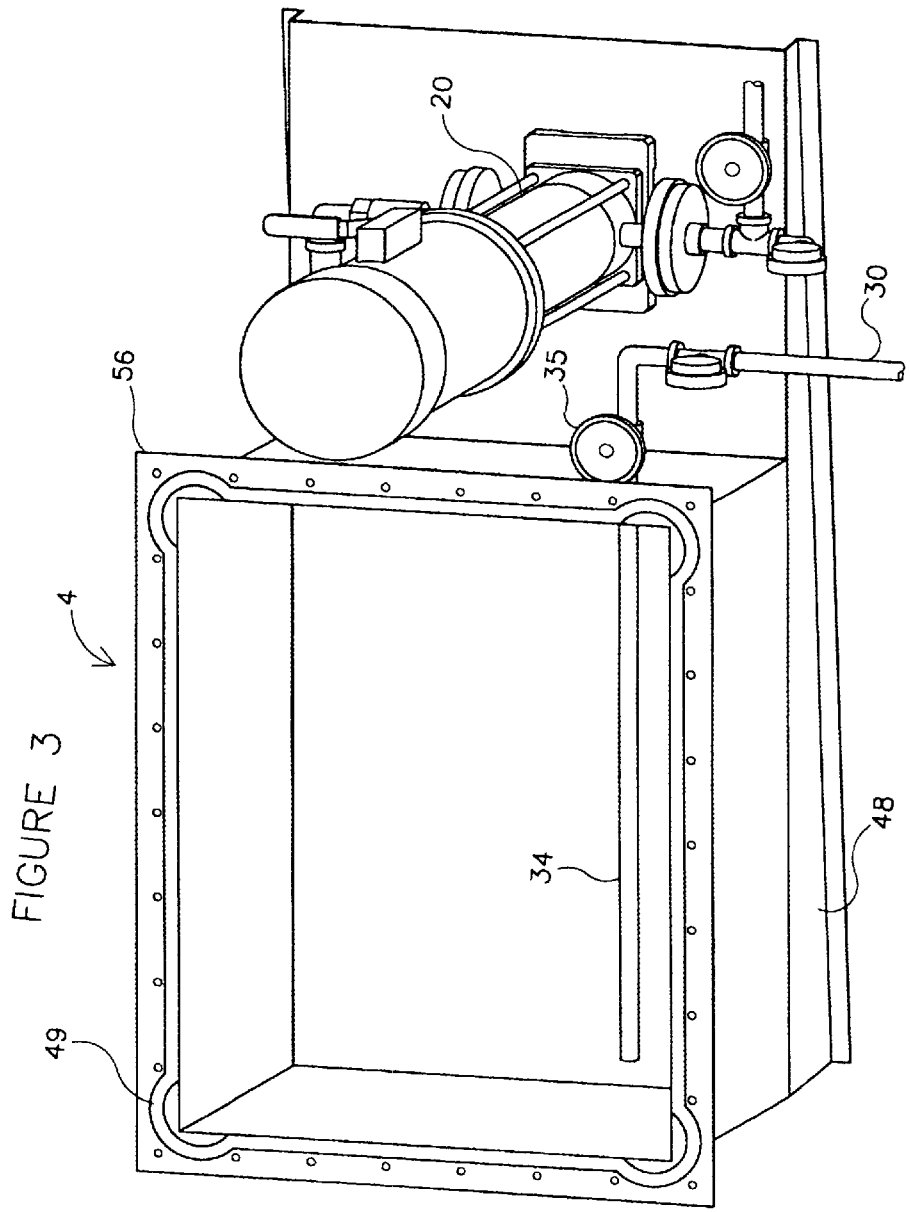

FILTRATION SYSTEM

CROSS-REFERENCE TO RELATED APPLICATION

The following U.S. patent application is hereby incorporated by reference in its entirety for its teachings:

U.S. application Ser. No. 60/288,191 for FILTRATION SYSTEM by Thomas Huemann, filed May 2, 2001.

FIELD OF THE INVENTION

The present invention relates to a filtration system for cleaning impurities from a liquid bath used for the purpose of cleaning or washing metal parts prior to the surfaces of the metal parts being provided with a protective and/or decorative coating.

BACKGROUND OF THE INVENTION

In order to properly apply protective and/or decorative coatings to metal parts, it is usually necessary to first clean the surfaces of the part which are to receive the coating. This is frequently done by immersing the part in a liquid bath. The liquid in the bath is typically a solvent or solution which is formulated to remove contaminants from the surface of the metal parts. The contaminants washed from the surface of the metal parts accumulate in the bath liquid. In order to continue cleaning or washing the metal parts it is necessary to keep the concentration of the contaminants in the bath liquid below a maximum acceptable concentration. Above that maximum acceptable concentration, an undesirable amount of contaminants would remain on the metal parts when they are removed from the liquid bath. One way by which the concentration of the contaminants in the bath liquid are kept below the maximum concentration is by replacing the bath liquid with clean liquid when the maximum concentration is about to be reached. The removed bath liquid may be hauled away, or it may be treated off-line to remove the contaminants, and thereafter either sewered or if for environmental reasons properly disposed of, or reused.

Alternatively, a filtering system may be provided which cycles the cleaning liquid through an on-line filter to remove contaminants from the liquid bath, thereby maintain the maximum concentration of contaminants in the bath below the maximum permissible concentration. Such a filtering system may operate without regard to whether or not the bath is in use for cleaning metal parts. Further, such a filtering system may be controlled to begin operation when the concentration of contaminants in the bath reaches a predetermined level, and to stop operating when a certain minimum concentration of contaminants is reached. This invention relates to an improvement in the latter type of filtering system.

SUMMARY OF THE INVENTION

In accordance with this invention, a filtering system is provided which cycles the cleaning liquid in a liquid bath through an on-line filter to remove contaminants from the cleaning liquid. A processing tank is connected for cleaning liquid flow to and from a liquid bath tank. A flow path is provided from near the bottom of the bath tank, to near the bottom of the processing tank. A porous filter element is submersed in the bath tank. A flow path through the porous filter is provided to and from the processing tank. A pump drawing cleaning liquid from the processing tank causes it to pass through the flow path in the porous filter, and back to the processing tank. While liquid is being pumped through the flow path in the porous filter, the pressure on the liquid is greater than the fluid pressure in the liquid bath tank surrounding the porous filter. Thus, cleaning liquid passes through the pores of the porous filter from the flow path to the liquid bath. The pores in the filter are sized to prevent contaminant from passing there through. Thus, cleaned liquid is returned to the liquid bath tank, and cleaning liquid with an increased concentration of contaminants is returned to the processing tank. When the concentration of contaminants in the processing tank reaches a predetermined level, the contaminated cleaning liquid must either be disposed of, or filtered to remove the contaminants and stored or returned to the filtering system for further use.

The present invention will be understood by reference to the following drawings and description.

BRIEF DESCRIPTION OF THE DRAWINGS

FIG. 3 shows a perspective view of the processing tank and associated pump of FIG. 2, with the sealed cover removed;

DETAILED DESCRIPTION OF THE PREFERRED EMBODIMENT

Figure 1:
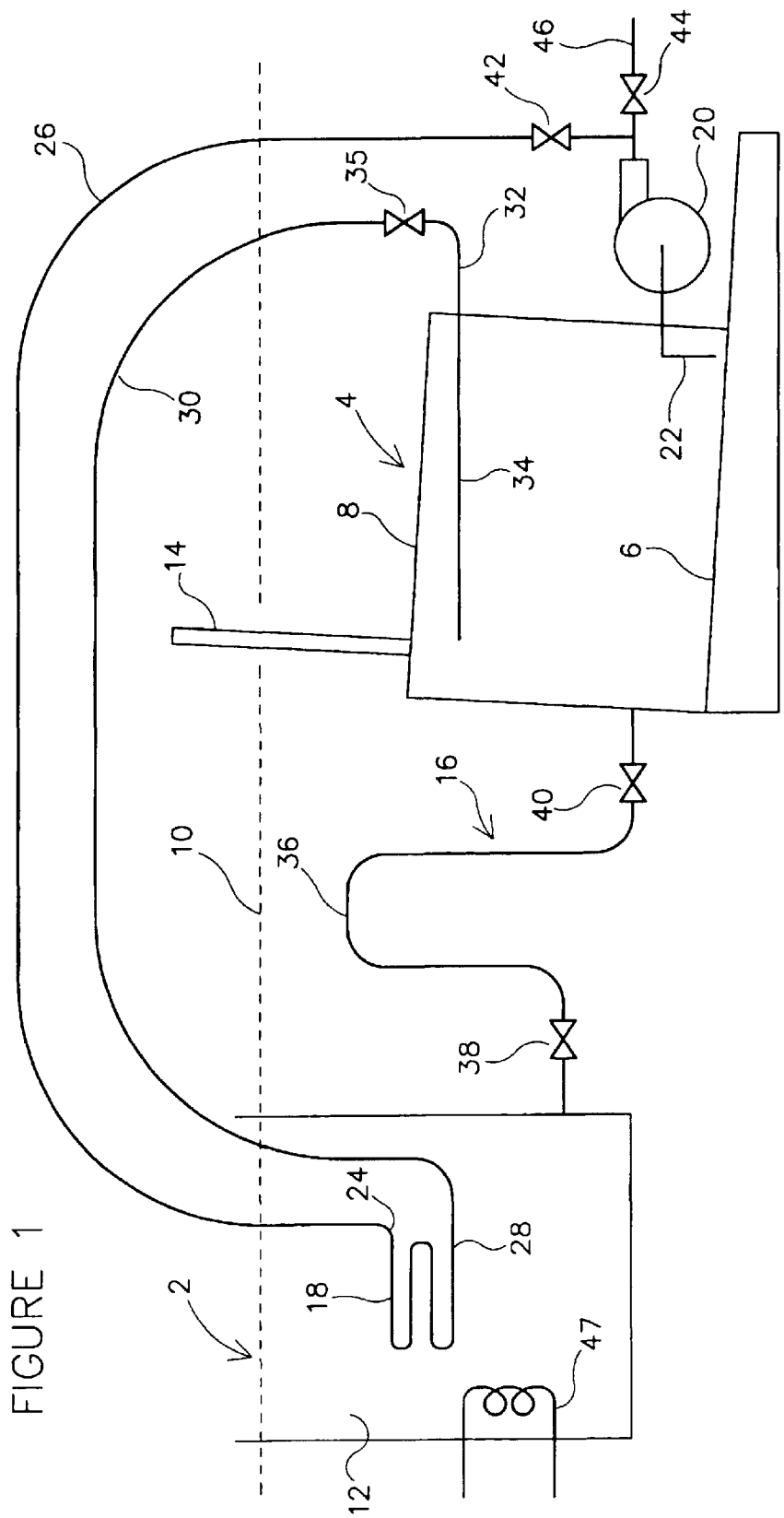
FIG. 1 is a schematic diagram of the filtration system of this invention.

Referring to FIG. 1, the filtration system of this invention is schematically illustrated for use with a liquid bath or wash tank 2, in which parts to be washed are immersed or sprayed, with a liquid cleaning chemistry. The filtration system includes a process tank 4 in which the contaminants, usually solid particles and oil, are concentrated after being removed from the cleaning liquid in the wash tank 2. The process tank 4 is essentially a closed container having a sloping bottom 6, and a top 8. The dashed line 10, indicates the upper surface level of a liquid cleaning chemistry 12 in the wash tank 2. As shown, the top 8 of the process tank 4 is below the surface level 10 of the liquid 12 in the wash tank 2. The top 8 of the process tank 4 is sealed to the side walls of the tank, such that liquid 12 can not escape from between the tank and the top 8. A vent 14, is provided in the top 8 of the process tank 4, with an open upper end well above the surface lever 10 of the liquid in the wash tank 2.

The wash tank 2 is connected to the process tank 4 by a first flow path 16. Thus, when the wash tank 2 is filled with a cleaning liquid, the process tank 4 is also filled by gravity flow through the flow path 16. Vent 14 provides for the escape of air from the process tank 4, such that process tank 4 will fill to the top 8 with the cleaning liquid. Since the open top of the vent 14 is above the surface level 10 of the liquid 12, liquid does not escape through the vent.

Figure 5:
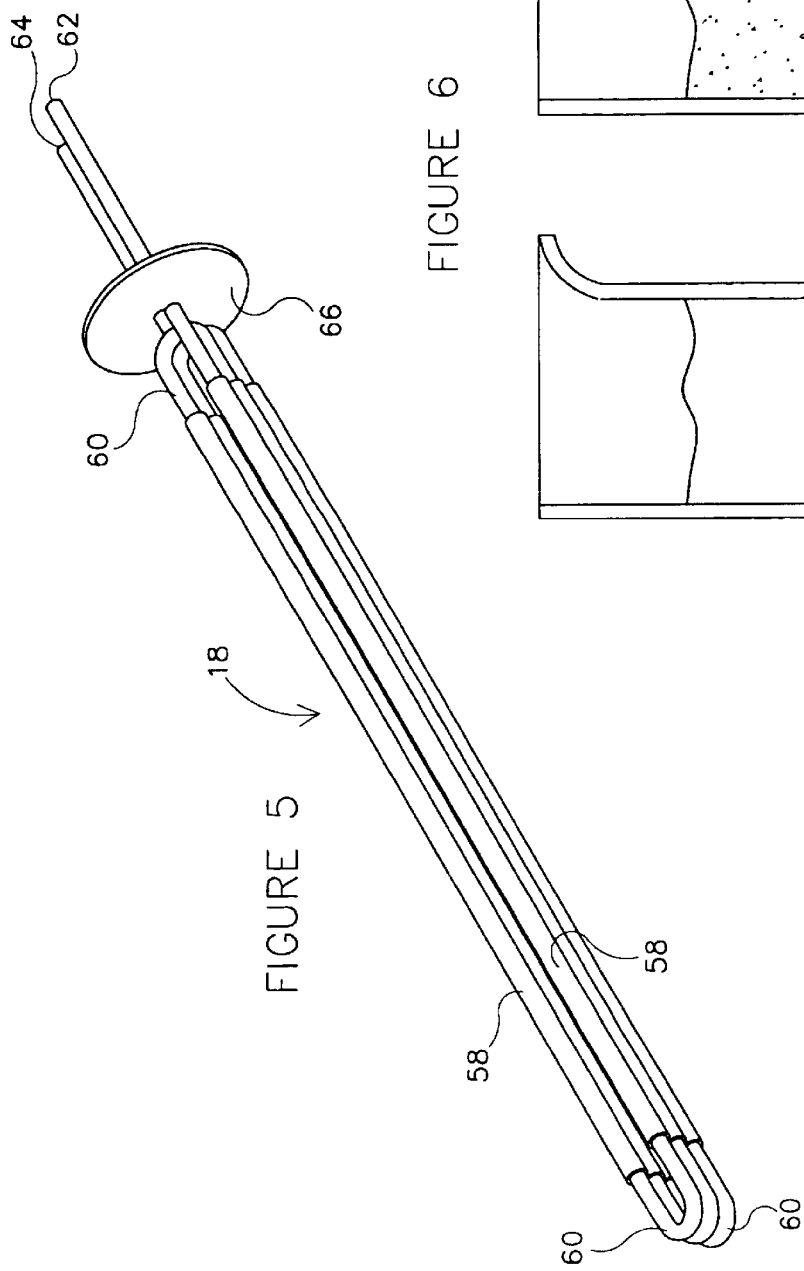
FIG. 5 shows a filter assembly used in the preferred embodiment of this invention.

A second flow path between the wash tank 2 and the process tank 4 includes a filter element 18 which is immersed in the wash tank 2. The preferred filter element 18 is in the form of a plurality of elongated porous hollow tubes connected in series by U-shaped connecting tubes as shown in FIG. 5. The pores or openings in the hollow tubes are sized to permit the cleaning fluid to pass through, but to prevent contaminant particles above a certain predetermined size from passing through. The inlet of a pump 20 is connected to an outlet 22 of process tank 4, which is located near the lowest end of the sloping bottom 6 of the process tank 4. The outlet of the pump 20 is connected to the inlet 24 of the filter 18 by a flow path 26. Outlet 28 of filter 18 is connected by a flow path 30 to an inlet 32 of process tank 4. The inlet 32 is connected to a pipe 34 located within and near the top of the process tank 4.

Figure 4B:
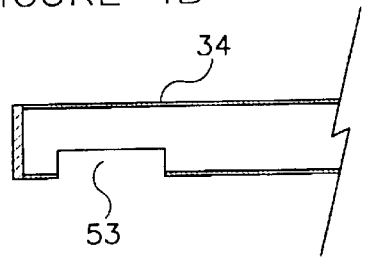
FIG. 4B is a cross-sectional view taken along the line 4B—4B in FIG. 4A, showing the outlet from the pipe.
Figure 4A:
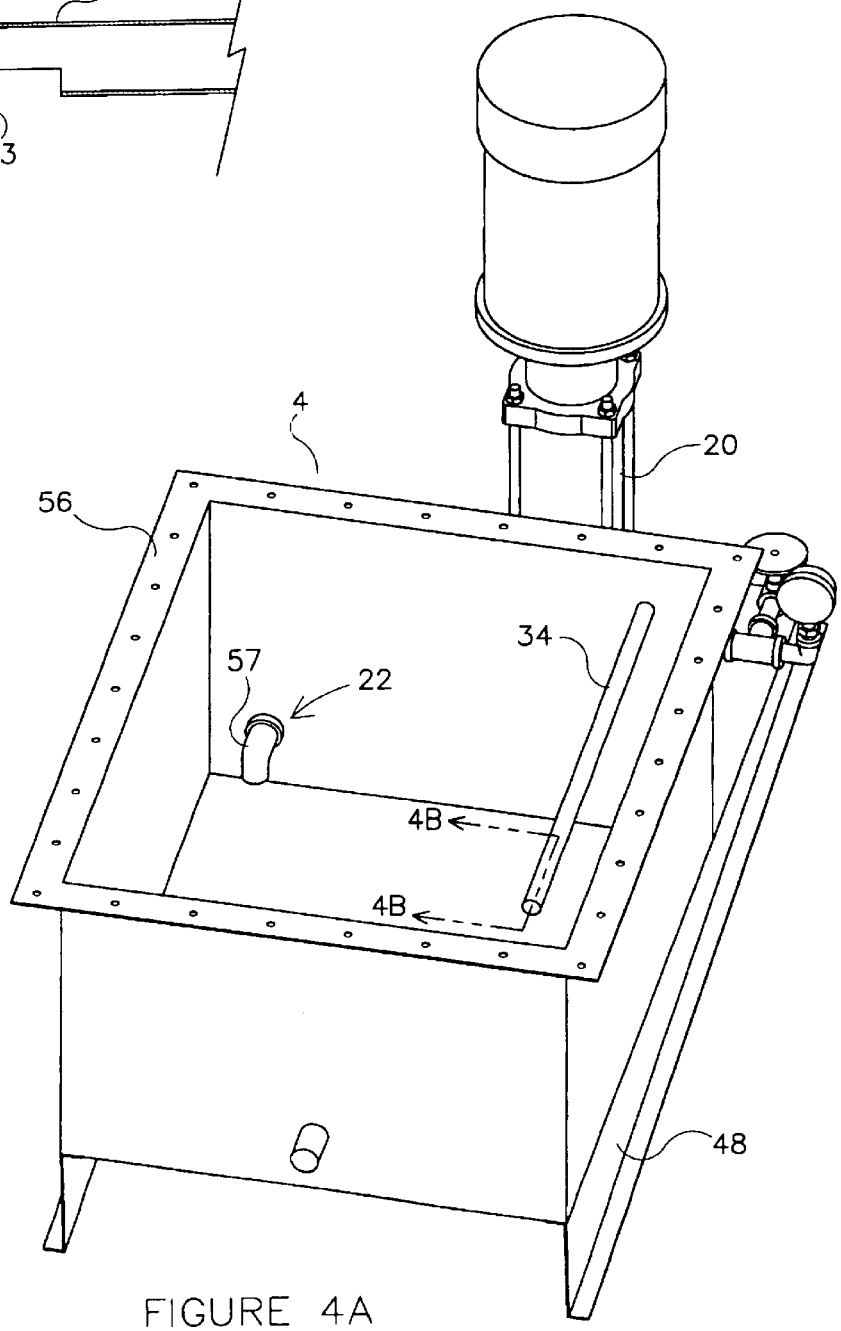
FIG. 4A shows another perspective view of the processing tank and associated pump of FIG. 2, with the sealed cover removed.

Operation of the pump 20 causes fluid located near the bottom of the process tank 4 to be drawn into the pump 20 and discharged through the outlet of the pump through flow path 26 to the inlet 24 of the filter 18. The fluid entering the filter 18 from the flow path 26 is under a pressure greater than that of the liquid 12 in the wash tank 2 surrounding the filter 18. The pressure on the fluid within the filter 18, will cause the fluid to flow through the pores or openings in the hollow tubes and into the wash tank 2. The remaining fluid, which contains a higher concentration of contaminants due to the flow of fluid through the pores or openings in the filter, will flow back to the process tank through flow path 30, inlet 32 and pipe 34. The pressure applied to the fluid in the filter 18 may be increased or decreased by decreasing or increasing respectively, the total area of the outlet from pipe 34, to process tank 4, or by adjusting the flow passage through valve 35. As shown in FIG. 4A, the outlet from pipe 34 is located at the opposite side of the process tank 4 from the outlet 22.

Fluid, but not particles of greater than a predetermined size, having passed into the wash tank through the pores in filter 18, the fluid which flows back to process tank 4 through flow path 30 has a greater concentration of particles of greater than a predetermined size which will pass through the opening or pores in the filter 18. Thus, as long as the pump 20 is in operation, it continues to circulate the cleaning fluid through the filter 18, thereby increasing the concentration of contaminants in the process tank 4 of greater than the predetermined size which will pass through the opening or pores in the filter 18.

As previously set forth, the process tank 4 is kept full of liquid through the force of gravity which causes fluid to flow from the wash tank 2 to the process tank 4 through the flow path 16. The flow path 16, which is preferably is a flexible hose, is formed such that a portion 36 of the hose is at an elevation corresponding to about 6 inches below the water level 10. Elevated portion 36 is provided to impede the flow of contaminants back into the wash tank 4 from the process tank 6, should liquid flow from process tank 6 to wash tank 4. Shut off valves 38 and 40 are provide in flow path 16 for isolating the tanks from each other, such as when servicing is necessary.

When the concentration of particulate matter and oils in process tank 4 increases to an undesirable level, one of both of the shutoff valves 38 and 40 are closed. Then, a valve 42 in the flow path 26 is closed and a valve 44 is opened, such that operation of pump 20 will discharge the fluid containing the undesirable level of particulate matter and oils from process tank 4, through an outlet path 46. The fluid and particulate matter discharged through outlet path 46 is collected for disposal or for further filtering, such that it may be returned to use. Pumping the fluid from the lower end of the sloping bottom 6, assures that essentially all of the particulate matter and fluid is pumped out of the process tank 4.

A heating device such as electrical heating element 47 is provided in wash tank 2 to maintain the liquid 12 at a desired elevated temperature to enhance its cleaning ability. Due to the circulation of the liquid between wash tank 2 and process tank 4, all of the liquid is maintained at near the desired elevated temperature, which results in faster processing speed and also helps control formation and propagation of undesirable biological species in the liquid 12.

In the following references to FIGS. 2–5, the same numerals are used to identify components of the filtering system of this invention as were used in FIG. 1.

Figure 2:
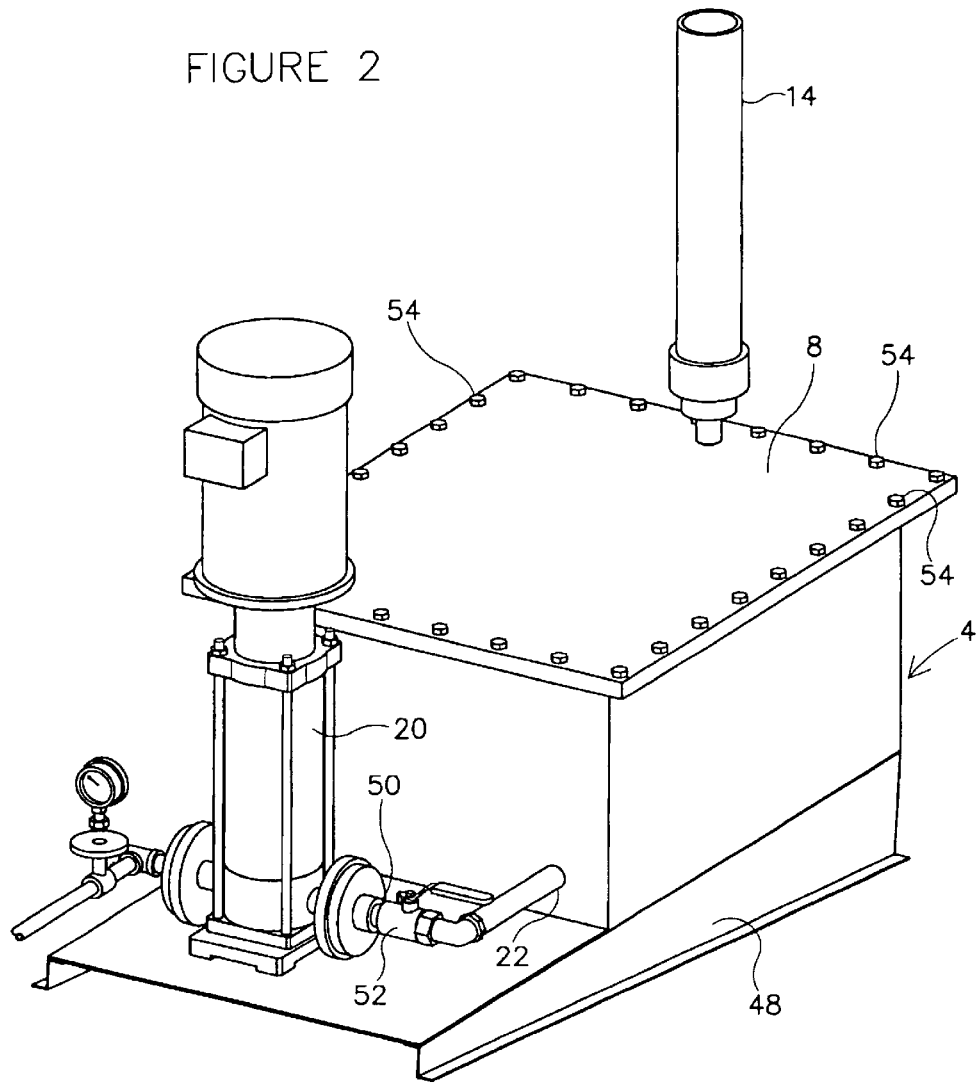
FIG. 2 shows a perspective view of a preferred embodiment of the processing tank and associated pump forming a part of the filtration system of this invention.

Referring to FIG. 2, a processing tank and pump as utilized in a preferred embodiment of this invention will be described. A rectangular processing tank 4 is supported on a wedge shaped platform 48, such that the bottom of the processing tank 4 is sloped downwardly toward the outlet 22 which is connected to the inlet 50 of pump 20 through a shut-off valve 52. The top or cover 8, is secured to the process tank 4 by a plurality of bolts 54.

Referring to FIG. 3, the processing tank 4, shown in FIG. 2 is shown with the cover 8 removed. As shown in FIG. 3, a resilient seal 49 is provided between the cover 8 and a flange 56 provided at the top of the sidewalls of the process tank 4. FIG. 4A is another view of the processing tank 4 shown in FIG. 2, with the cover removed. The pipe 34 through which fluid is returned to the processing tank 4 is shown almost extending across the length of the tank 4. As shown in FIG. 4B, an opening 53 is provided in the pipe 34 near the side of the tank 4 opposite the side adjacent to which the pump 20 is located. In addition to the components shown in FIG. 3, the outlet 22 from the processing tank 4 is shown. As shown, the outlet 22 includes an elbow 57 opening toward the bottom 6 of the processing tank 4, such that liquid is drawn from the bottom of the tank by the pump, to be circulated through flow path 26. When the pump is used to empty the processing tank 4, essentially all of the liquid can be removed from the tank, since the open end of the elbow 52 is located close to the bottom of the lowest end of the tank.

FIG. 5 shows the preferred form of the filter 18 which is immersed in the wash tank 2. The filter is formed of a plurality of elongated porous hollow tubes 58 connected in series by U-shaped connecting tubes 60. An inlet 62 and an outlet 64 are provided for directing the flow of fluid through the hollow tubes 58 and the u-shaped connecting tubes 60. The perforations or pores in the tube are sized to permit the cleaning fluid to pass there through, but to prevent particles above a certain predetermined size from passing there through. A flange 66 is provided on the filter for mounting the filter through a hole in the side of wash tank 4.

Figure 6:
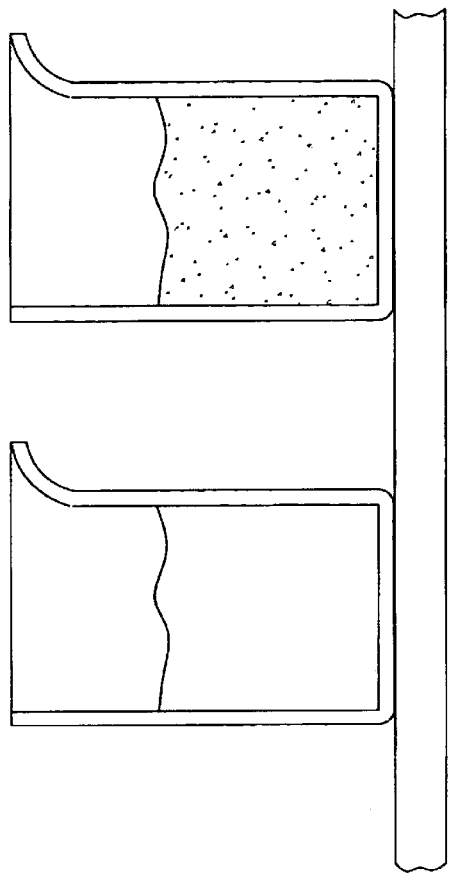
FIG. 6 shows beakers containing cleaning fluid used in the preferred embodiment of this invention, with fluid returned to the wash tank shown on the left, and fluid in the processing tank shown on the right.

FIG. 6 shows two beakers, with the one on the left showing the liquid cleaning fluid in the wash tank after being filtered, and the one on the right the cleaning fluid in the process tank after filtering of the fluid in the wash tank.

Figure 7:
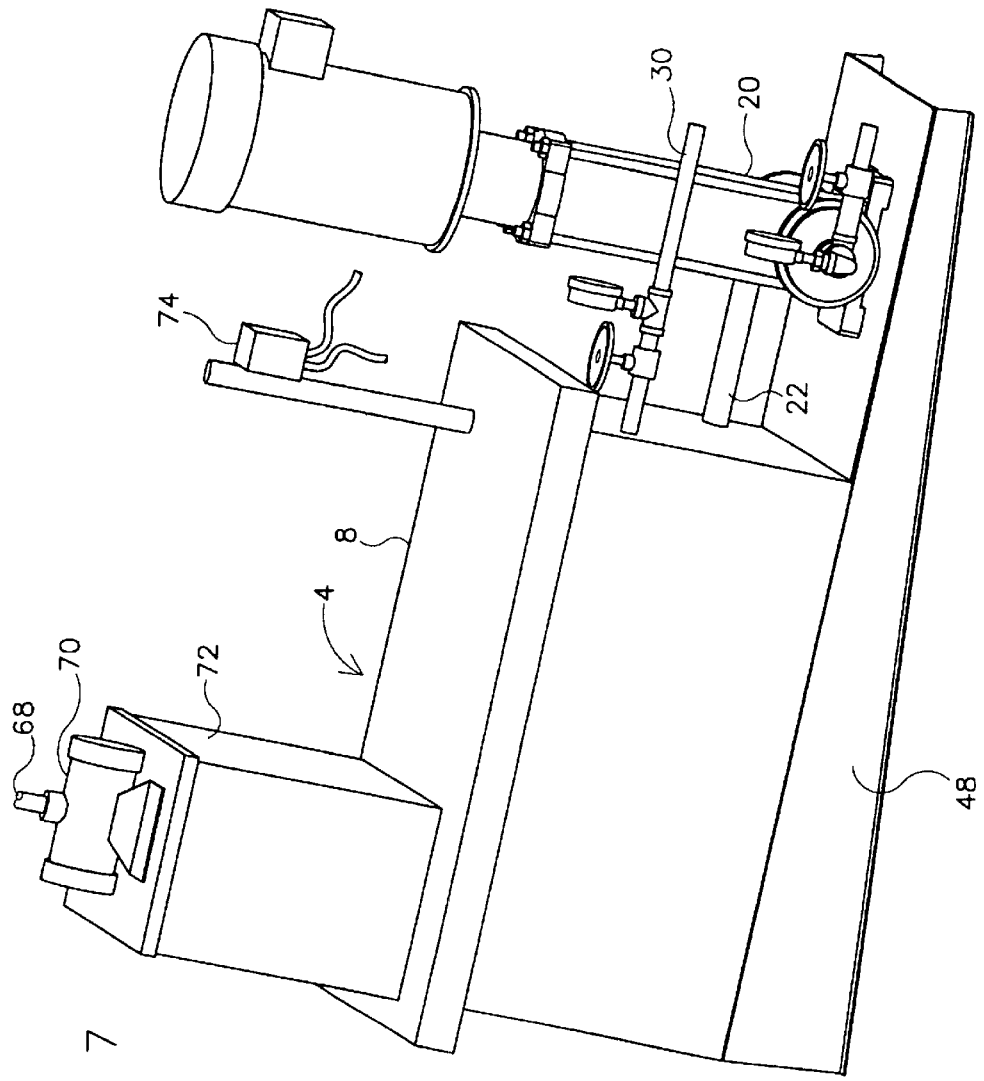
FIG. 7 shows and alternate embodiment of the processing tank and associated pump forming a part of the filtration system of this invention.

FIG. 7 shows the process tank of a second embodiment of this invention. The elements of the processing tank in common with those of the first embodiment are identified by the same numerals. The second embodiment of this invention is intended for use in applications wherein the flow of fluid from the wash tank 4 to the process tank 4 through flow path 16 as shown in FIG. 1 will not result from gravity flow. For instance, such a situation may exist when the wash tank is located in a pit below floor level, and the processing tank much be locate on or above the floor level. Referring to FIGS. 1 and 7, the pipe extending from valve 38 is connected to inlet 68 of a pump 70 shown in FIG. 7. The pump 70 is mounted on top of an enclosure 72 which is formed over an opening in the cover or top 8 of the processing tank. The bottom edge of enclosure 72, which is shown as rectangular, forms a liquid tight seal with the top 8. The pump 70 discharges into the enclosure 72, such that after the cleaning fluid 12 fills the processing tank 4, it will rise in the enclosure 72. A liquid level control switch 74 is provided to control the operation of pump 70, so turn the pump off before the liquid level reaches the top of enclosure 72, and to turn it on before the fluid level drops below the pipe 34. Due to the need for the additional pump and control system in the second embodiment, the first embodiment is preferred.

While only two embodiments of the invention has been shown, it should be apparent to those skilled in the art that what have been described are considered at present to be the preferred embodiments of the filtration system of this invention. In accordance with the Patent Statute, changes may be made in the filtration system without actually departing from the true spirit and scope of this invention. The appended claims are intended to cover all such changes and modification which fall in the true spirit and scope of this invention.

What is claimed is:

1. A filtering system for removing contaminants from a cleaning fluid in a wash tank, the cleaning fluid having an upper surface level, comprising:

A. a processing tank, said processing tank having a sealed top, said processing tank having an inlet port and an outlet port, said inlet port being located near the top of said processing tank, said outlet port being located near the bottom of said processing tank, the bottom of said processing tank being sloped downwardly toward said outlet port, B. a filter submerged in said wash fluid in said wash tank, said filter comprising a tubular member having walls and an inlet and an outlet, said walls of said tubular member having holes therein which are to small for the contaminants to pass through, C. a pump, said pump having an inlet port, and a discharge port, said inlet port being connected to receive cleaning fluid from said outlet port of said processing tank, said discharge port being connected to said inlet of said filter, the outlet of said filter being connected said inlet port of said processing tank, said pump causing the flow of cleaning fluid from said processing tank through the filter and back to the inlet port of the processing tank, said pump creating sufficient pressure on the fluid flowing through said filter to cause fluid to flow through the holes in said filter and into said wash tank, the size of said holes being such that said contaminants can not pass through said holes, such that the concentration of contaminants is greater in the fluid flowing from the filter to the inlet of said processing tank, than that flowing to said filter from said process tank, D. a flow path connecting said wash tank and said processing tank, for flow of cleaning fluid between said wash tank and said processing tank, such that said processing tank is filed with cleaning fluid.

2. The filtering system of claim 1, wherein the flow of cleaning fluid in said flow path connecting said wash tank and said process tank is caused by gravity.

3. The filtering system of claim 1, wherein a pump is provided to cause the flow of cleaning fluid in said flow path connecting said wash tank and said process tank.

4. The filtering system of claim 3, wherein an enclosure is provide on said sealed top, with a liquid flow path between the said process tank and said enclosure, said pump being controlled to maintain the top surface of the liquid close to the top of said process tank or in said enclosure.

5. A filtering system for removing contaminants from a cleaning fluid in a wash tank, the cleaning fluid having an upper surface level, comprising:

A. a processing tank, said processing tank having a sealed top, said sealed top being provided with a vent which extends above the upper surface level of the cleaning fluid in said wash tank, said processing tank having an inlet port and an outlet port, said inlet port being located near the top of said processing tank, said outlet port being located near the bottom of said processing tank, the bottom of said processing tank being sloped downwardly toward said outlet port, B. a filter submerged in said wash fluid in said cleaning tank, said filter comprising a tubular member having walls and an inlet and an outlet, said walls of said tubular member having holes therein which are to small for the contaminants to pass through, C. a pump, said pump having an inlet port, and a discharge port, said inlet port being connected to receive cleaning fluid from said outlet port of said processing tank, said discharge port being connected to said inlet of said filter, the outlet of said filter being connected said inlet port of said processing tank, said pump causing the flow of cleaning fluid from said processing tank through the filter and back to the inlet port of the processing tank, said pump creating sufficient pressure on the fluid flowing through said filter to cause fluid to flow through the holes in said filter and into said wash tank, the size of said holes being such that said contaminants can not pass through said holes, such that the concentration of contaminants is greater in the fluid flowing from the filter to the inlet of said processing tank, than that flowing to said filter from said process tank, D. a flow path connecting said wash tank and said processing tank, for flow of cleaning fluid between said wash tank and said processing tank, such that said processing tank is completely filed with cleaning fluid, with said cleaning fluid rising to the upper level of the cleaning fluid in said wash tank in said processing tank vent.

6. The filtration system of claim 1, wherein said wash tank is provided with a sealed cover and a vent tube having an open upper end, said open upper end extending above the top surface of the cleaning fluid in the wash tank.

7. The filtration system of claim 1, wherein said bottom of said processing tank is sloped downwardly toward said outlet port.

8. The filtration system of claim 1, wherein said filter element comprises a plurality of elongated porous hollow tubes connected in series by U-shaped connecting tubes, the pores in tubes being sized to permit cleaning fluid to pass there through but not particles of contaminant.

* * * * *

UNITED STATES PATENT AND TRADEMARK OFFICE
CERTIFICATE OF CORRECTION

PATENT NO. : 6,706,173 B1
DATED : March 16, 2004
INVENTOR(S) : Thomas W. Huemann It is certified that error appears in the above-identified patent and that said Letters Patent is hereby corrected as shown below:

Column 6,
Line 24, the first line of paragraph B, should state:
-- a filter submerged in said cleaning fluid in said wash --

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,706,173 B1
DATED : March 16, 2004
INVENTOR(S) : Thomas W. Huemann It is certified that error appears in the above-identified patent and that said Letters Patent is hereby corrected as shown below:

Column 6,
Line 24, the first line of paragraph B. should state: -- a filter submerged in said cleaning fluid in said wash --

Signed and Sealed this

Third Day of May, 2005

JON W. DUDAS
*Director of the United States Patent and Trademark Office*